B. B. GUNNOE.
HOOK FOR ANTISKID CHAINS.
APPLICATION FILED MAR. 7, 1916.
1,235,682.
Patented Aug. 7, 1917.
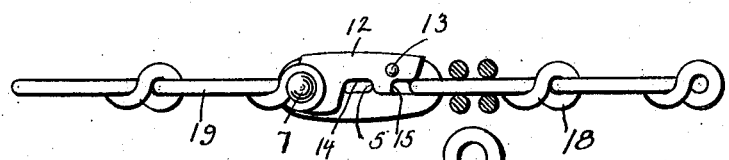
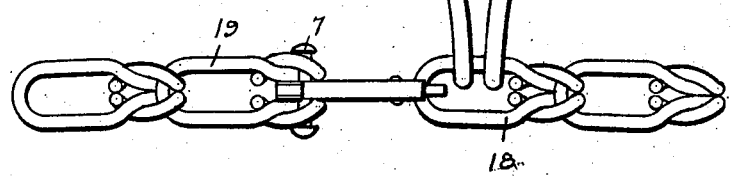
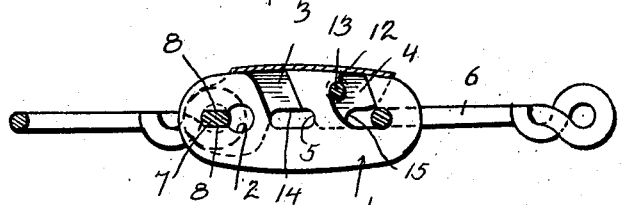
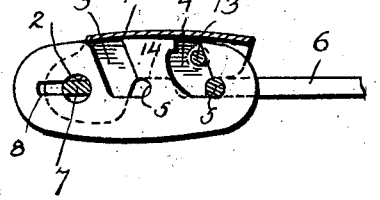
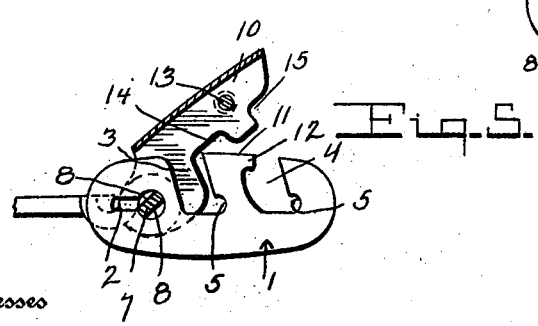
Inventor
B·B·Gunnoe

UNITED STATES PATENT OFFICE.

BERTA B. GUNNOE, OF BECKLEY, WEST VIRGINIA.

HOOK FOR ANTISKID-CHAINS.

1,235,682.  Specification of Letters Patent.  Patented Aug. 7, 1917.

Application filed March 7, 1916. Serial No. 82,621.

*To all whom it may concern:*

Be it known that I, BERTA B. GUNNOE, a citizen of the United States, residing at Beckley, in the county of Raleigh and State of West Virginia, have invented certain new and useful Improvements in Hooks for Antiskid-Chains; and I do hereby declare the following to be a full, clear, and exact description of the invention, such as will enable others skilled in the art to which it appertains to make and use the same.

This invention relates to a hook link for connecting the free ends of a non-skid tire chain such as used upon motor vehicle tires and the primary object of the invention is to provide a hook link by means of which the free ends of a non-skid chain may be quickly and easily connected, and held in proper position upon a tire against accidental disconnection.

A further object of this invention is to provide a hook link as specified which includes a main body and a pivoted cover which is pivotally connected to the main body of the hook and is adapted for preventing the accumulation of dirt, mud or the like within the open spaces within the link and also for locking the link in a closed position to prevent the accidental disconnection between the hook link and the chains.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved hook link showing the same applied to a portion of a non-skid chain such as is used upon ordinary motor vehicles.

Fig. 2 is a plan view of a fragment of a non-skid chain showing the improved hook link attached thereto.

Fig. 3 is a sectional view through the hook link showing the same in a closed and locked position.

Fig. 4 is a sectional view through the hook link showing the same in a closed and unlocked position, and Fig. 5 is a sectional view through the link showing the same in an open position for connection to the chain.

Referring more particularly to the drawings, 1 designates the body of the hook link as an entirety, which is constructed of the ordinary material employed for the purpose of making chain links. The body 1 is provided with a key hole 2 extending through one end of the same and with a pair of cut-out portions 3 and 4 which extend inwardly from the upper end of the link 1 and have arcuate forwardly extending extensions 5 formed upon their lower ends, which extensions are adapted for receiving the ends of the link of an ordinary non-skid chain indicated by the numeral 6.

A bolt 7 extends through the key hole slot 2 and it has a portion thereof flattened as clearly shown at 8, for snugly fitting within the rectangular portion of the key hole. The bolt 7 has a cover plate 10 connected thereto which is adapted for forming a cover for the upper or top edge of the link 1. The upstanding portion 11 of the link 1 which is positioned intermediate the cut-out portions 3 and 4 has a forwardly extending lug 12 formed thereon which overhangs the rear wall of the front recess 4, and is slightly curved for conforming to the curvature of a pin 13, which is seated beneath the projection 12 when the cover is locked in position. The pin 13 is carried by the pivoted cover 10. The lower edges of the sides of the cover 10 are provided with cut-out portions 14 and 15 which are adapted for alinement with the lower portion of the cut-out portions 3 and 4 for forming the spaces for receiving the ends of the link of the free end of a non-skid chain as clearly shown in Fig. 3 of the drawing. The bolt 7 has one of the free ends of one of the side chains of the non-skid chain coiled thereabout which connects the locking link 1 to the end of the chain as shown in Figs. 1 and 2 of the drawings.

When it is desired to connect the free ends of a non-skid chain as illustrated at 18 in Figs. 1 and 2 of the drawings, the cover plate 10 is moved forwardly so that the flattened portion of the bolt 7 will be seated in the round portion of the key hole slot which will permit the cover plate to be swung upwardly into the position as illustrated in Fig. 5 of the drawings, after which the end of the link 6 is inserted preferably in the front cut-out portion 4 until it is seated in the forwardly extending extension 5 of the cut-out portion after which the cover plate is moved into a closed unlocked position as illustrated in Fig. 4 and a rearward pull on the section 19 of the chain or in other words the section to which the locking link is permanently connected will move the flattened portion of the bolt 7 into the rectangular portion of the key hole slot 2 and also move the pin 13 beneath the forwardly extending projection 12 as clearly shown in Fig. 3 of the drawings which will lock the links against accidental opening and prevent the accidental disconnection of the free ends of the chain. If it is so desired the link 6 may be inserted in the cut-out portion 3 for shortening the connection of the ends of chain.

In reducing the invention to practice certain minor features of construction, combination and arrangement of parts may necessitate alterations to which the patentee is entitled provided such alterations are comprehended within the scope of what is claimed.

What is claimed is:—

A hook comprising an elongated body having a key hole slot in one end thereof and a pair of downwardly and forwardly extending recesses in the center and forward end thereof, said recesses having forwardly extending extensions on their lower forward ends, either of which is adapted to receive one end of a chain, a bolt extending through the key hole slot and having the other end of the chain connected thereto, a cover secured to said bolt and adapted to close the upper ends of the recesses, said bolt having a flattened portion adapted to fit in the rectangular portion of the key hole slot to hold the cover in engagement with the body, and which will permit the cover to be swung upwardly from the body when said cover is moved forwardly of the body to position the flattened portion of the bolt in the circular opening of the key hole slot, said forward recess having a notch formed on its rear wall for engaging the upper end, a pin carried by the cover and adapted to engage the notch to lock the cover to the body.

In testimony whereof I affix my signature in presence of two witnesses.

BERTA B. GUNNOE.

Witnesses:
B. J. SHUMATE,
J. W. HARPER.

Copies of this patent may be obtained for five cents each, by addressing the "Commissioner of Patents, Washington, D. C."